Aug. 27, 1968  G. T. BALTUS ET AL  3,398,646
LEAD SIGNAL GENERATION APPARATUS FOR USE IN CONTROL SYSTEMS
Filed April 8, 1966  2 Sheets-Sheet 1
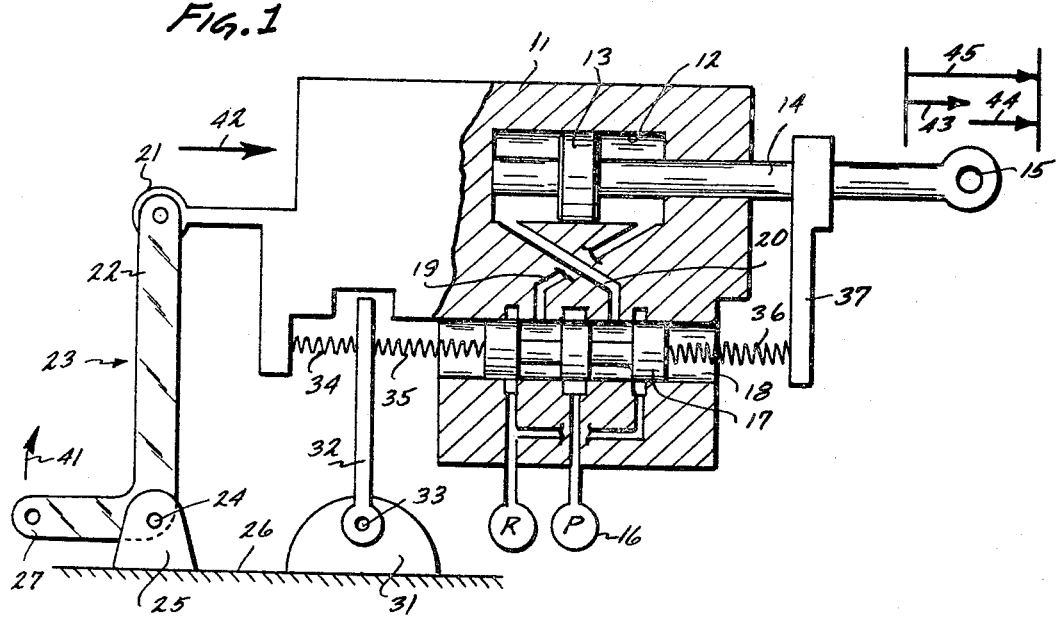
Fig. 1
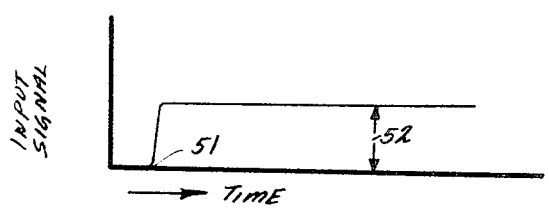
Fig. 2A
Fig. 2B
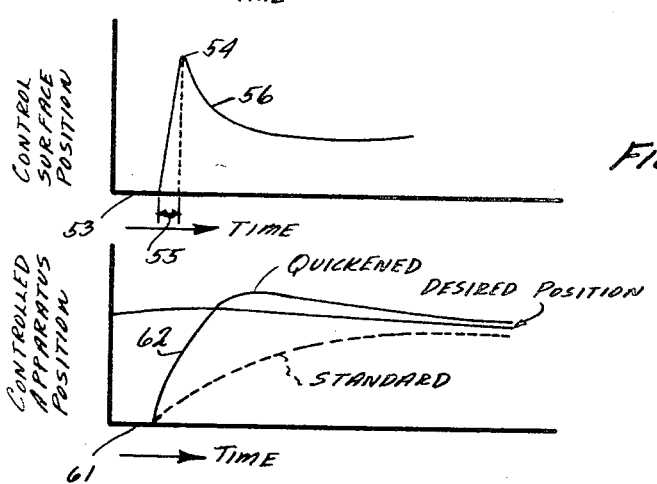
Fig. 2C
INVENTORS
GEORGE T. BALTUS
RAYMOND WARMUZ
By Nilsson, Robbins & Anderson
ATTORNEYS Aug. 27, 1968   G. T. BALTUS ET AL   3,398,646
LEAD SIGNAL GENERATION APPARATUS FOR USE IN CONTROL SYSTEMS
Filed April 8, 1966   2 Sheets-Sheet 2

INVENTORS
GEORGE T. BALTUS
RAYMOND WARMUZ
BY Wilson, Robbins & Anderson
ATTORNEYS

3,398,646
LEAD SIGNAL GENERATION APPARATUS FOR USE IN CONTROL SYSTEMS

George T. Baltus and Raymond Warmuz, Tonawanda, N.Y., assignors to Bell Aerospace Corporation, a corporation of Delaware
Filed Apr. 8, 1966, Ser. No. 541,215
11 Claims. (Cl. 91—217)

ABSTRACT OF THE DISCLOSURE

Disclosed is a hydraeric apparatus for connection in series with a control link adapted to receive mechanical input signals. The apparatus responds to the mechanical input signals in such a manner as to cause the output thereof to lead the mechanical input signal proportional to the velocity of the mechanical input signal, upon the initial application thereof.

---

This invention relates generally to control systems and more particularly to controlled apparatus which inherently lags position command signals applied thereto having incorporated as an integral part thereof hydraeric control apparatus to reduce said lag.

The term "hydraeric" as used throughout this specification and claims is generic to liquids and gases under pressure and intended to cover generically both hydraulics and pneumatics.

Many control apparatus inherently lag behind position command signals applied to them, for example, boats, aircraft and the like. Under many operating conditions it is highly desirable to cause the controlled apparatus to respond initially more rapidly to the command signal and then as the controlled apparatus approaches the desired position, to respond normally, for example by assuming the desired position. The control surface of the controlled apparatus is, to accomplish the initially more rapid response, caused to overshoot that position which it would normally assume in response to the input signal; that is, the response of the control apparatus to the command signal is quickened. Furthermore, it is often desirable, particularly where large control surfaces on the controlled apparatus may be employed, to provide a power boost to assist the operator in accomplishing control of the apparatus.

The desirability of a controlled apparatus to respond in a quickened manner to an input command signal has been recognized for some time. See, for example, a paper entitled, "Control and Maneuver Requirements for Armed Helicopters" presented by H. K. Edenborough and K. G. Wernicke at the American Helicopter Society Inc., Twentieth Annual National Forum, May 13–14–15, 1964, Washington, D.C. As is disclosed in the above referred to paper, a mechanical apparatus is inserted in series with the control linkage from the pilot to the control surface of a helicopter such that the pilot's mechanical motion input signal is amplified by the quickener apparatus to cause an overshoot in the initial response, thus causing the aircraft to respond more rapidly to the input signal. The mechanical apparatus disclosed in the above referred to paper operated very adequately and effectively for the purpose intended. However, it has been found that under certain operating circumstances, the power required from the operator is excessive and in some instances friction and inertia downstream of the quickener inserts operating difficulties and requires additional power to be applied by the operator.

Accordingly, it is an object of the present invention to provide hydraeric apparatus in series with the control link between the operator and the control surfaces of the controlled apparatus adapted to respond initially more rapidly to applied mechanical signals thereby to quicken the response of the controlled apparatus associated therewith to command signals.

It is another object of the present invention to provide hydraeric quickener apparatus in series with the control link between the operator and the control surface of the controlled apparatus for use where power boost in a control system is desirable, particularly under those conditions requiring rapid positive response to applied command signals.

It is a further object of the present invention to provide hydraeric quickener apparatus the effect of which is initial only in a sustained applied signal and which initial effect automatically diminishes with time.

Further and additional advantages and objects of the present invention will become apparent from a consideration of the following description taken in conjunction with the accompanying drawings which are presented by way of example only and are not intended as a limitation upon the scope of the present invention as defined in the appended claims and in which:

FIGURE 1 is a schematic representation of one embodiment of a hydraeric servo actuator quickener apparatus in accordance with the present invention;

FIGURES 2A, 2B and 2C are graphs illustrating time response of a controlled apparatus equipped with a hydraeric servo actuator quickener apparatus in accordance with the present invention.

Figure 3:
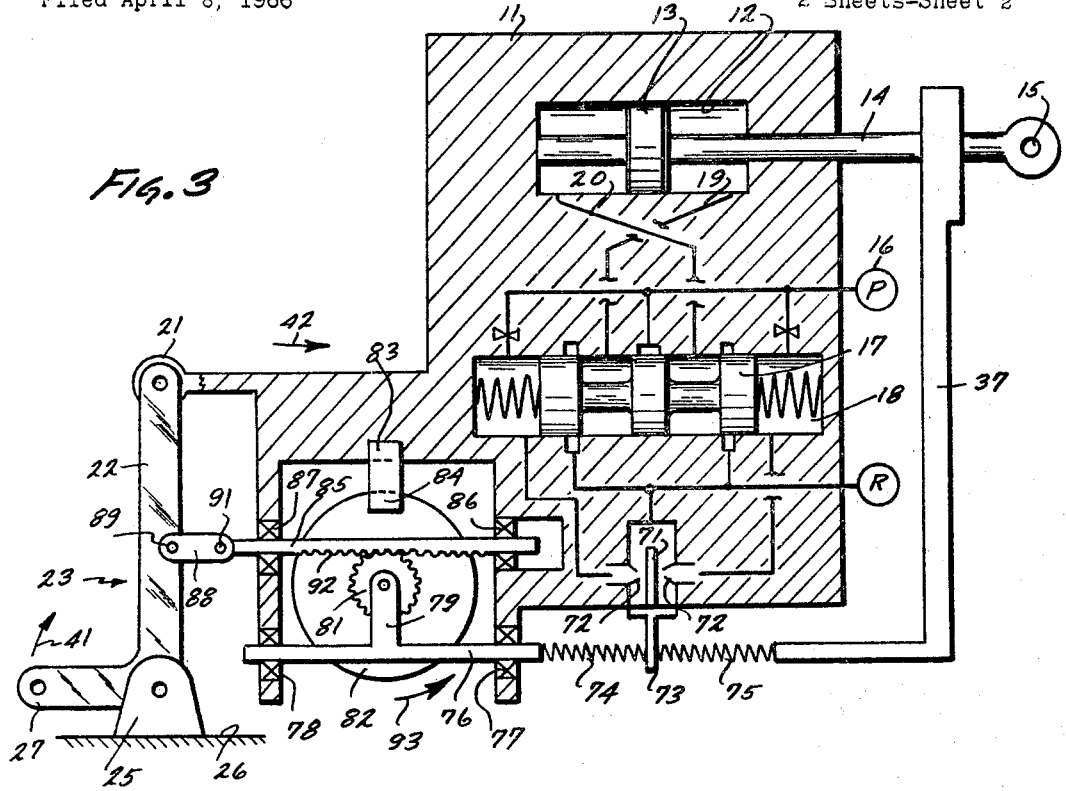
FIGURE 3 is a schematic representation of an alternative embodiment of a servo actuator hydraeric quickener in accordance with the present invention.

A hydraeric servo actuator quickener for utilization in positioning a controlled apparatus in response to a mechanical command signal which is applied thereto includes an actuator which is adapted to be coupled to the controlled apparatus and which receives mechanical input signals from the operator of the apparatus. Affixed to the apparatus is means for producing a quickener signal which has an amplitude proportional to the velocity of the mechanical input signal and further has a phase relationship in which it leads the mechanical input signal. The mechanical input signal is applied simultaneously to the quickener signal producing means as well as to the actuator means. A hydraeric amplifier is included which receives the signal from this quickener signal producing means and in response thereto applies hydraeric fluid output flow to the actuator to cause the same to respond accordingly.

Referring now to the drawings and more particularly to FIGURE 1 thereof, a preferred embodiment of a servo actuator quickener in accordance with the present invention is disclosed. Similar parts bear the same reference numeral throughout the drawings. As is therein shown, a housing 11 defines a cylinder 12 within which there is disposed an actuator piston 13. Connected to the actuator piston 13 is an actuator rod 14 which is adapted at its terminal end 15 for coupling to the controlled apparatus to which the servo actuator quickener is affixed. For example, the end 15 may be connected directly to a control surface or alternatively, may be connected to a linkage mechanism such as a rod, cable or the like which in turn is connected to a control surface. A source of hydraeric fluid 16 also designated by the letter P is controlled by a spool valve 17 which is slidably disposed within the cylinder 18 also defined by the housing 11. In response to the movement of the spool valve 17 the hydraeric fluid flows through passageways 19 and 20 into the cylinder 12 to thus cause movement of the actuator rod 14 and the controlled apparatus. Positioning of the spool valve 17 will be described more in detail hereinbelow. The housing 11 also defines an end 21 which is pivotally coupled to one end 22 of a bell crank 23. The bell crank 23 is pivoted for movement at pivot point 24 to an anchor member 25 which in turn is rigidly affixed to the controlled apparatus as designated by the ground symbol 26. The opposite end 27 of the bell crank 23 is adapted for coupling to means for generating a mechanical input signal. For example, the end 27 of the bell crank 23 may be coupled to the wheel or stick of a boat or aircraft respectively, either directly or through some mechanical linkage.

Also affixed to the controlled apparatus as designated by the ground symbol 26 is a force resisting means such as a viscous damper apparatus 31. A rod means 32 is coupled at a pivot point 33 to the viscous damper 31. Any viscous damping apparatus known to the art may be utilized, such for example as a pair of movable vanes within opposed chambers which have segments thereof interconnected through an orifice of a given size so as to impart restricting force to the movement of the rod 32 about the pivot point 33. That is, even though a force is applied to the rod 32 to tend to cause it to pivot about point 33, the rod 32 resists such force by an amount dependent upon the restricting characteristics of the damper mechanism and thereafter will follow the force applied. A damper spring 34 is connected between the rod 32 and the housing 11 while an additional damper spring 35 is connected between the rod 32 and the spool valve 17. Thus, differences in movements between the housing 11 and the rod 32 are coupled through the damper spring 35 as input signals to the spool valve 17. It can therefore be seen that the greater the difference in movement, the larger the input signal to the spool valve 17. Furthermore, the faster that housing 11 is moved, compared to any given restricting force on the rod 32, the larger the signal applied to the spool valve 17. Therefore, the amplitude of the signal is directly proportional to the velocity of the input signal. A feedback spring 36 is coupled to the opposite side of the spool valve 17 and also to a mechanical feedback rod 37 which is rigidly affixed to the actuator rod 14. Thus, position feedback from the actuator to the spool valve is applied as a feedback signal through the spring 36 to the spool valve 17.

In operation it will be assumed that a mechanical input signal is applied to the end 27 of the bell crank 23 so as to cause the same to move upwardly as viewed in FIGURE 1 and as indicated by the arrow 41. Such upward movement is coupled by the bell crank to the end 21 of the housing 11 causing it to move toward the right as indicated by the arrow 42. This movement then is imparted to the end 15 of the actuator rod 14 as indicated by the arrow 43. Such movement normally causes the control surface coupled to the end 15 of the actuator rod 14 to move as desired and to cause the controlled apparatus to respond accordingly. Such would be the case should the piston 13 and rod 14 be held rigidly in place thus constituting a rigid mechanical link in the control chain of the apparatus.

As the housing 11 is moved toward the right as indicated by the arrow 42, a force is applied by damper spring 34 to the rod 32 to urge it also toward the right as viewed in FIGURE 1. However, since the rod 32 is affixed to the viscous damper 31, it resists such movement and initially tends to remain in a stationary position. As a result thereof, spring 35 is placed in tension and causes a force to be applied toward the left on the spool valve 17, causing it to move toward the left as viewed in FIGURE 1. Such movement of the spool valve 17 toward the left causes fluid flow from the source 16 thereof through the conduit 20 to the left side of the cylinder 12, thus causing the piston 13 to move toward the right, as indicated by the arrow 44. As the piston 13 moves toward the right it carries the rod 14 along with the feedback rod 37 therewith. Through the feedback spring 36 a force reduction which is opposite in direction to that initially applied by spring 35 is effected at the opposite side of the spool valve 17. When the movement of the feedback rod 37 is sufficient to counterbalance the reduced force level being applied to the left side of the spool valve 17, the spool valve 17 is then in its null position as illustrated in FIGURE 1 in such a manner that all fluid flow to the cylinder 12 is cut off.

In this position, it should be noted that the end 15 of the actuator rod 14 has now moved a distance equal to the initial mechanical input as illustrated by the arrow 43 plus the additional distance supplied by the servo actuator as indicated by the arrow 44, the combination being indicated by the arrow 45 in FIGURE 1. At this point, therefore, it can be seen that the servo actuator quickener has caused the actuator rod 14 and the control surface or other mechanism coupled thereto to actually lead the applied mechanical input command signal applied to the quickener mechanism in the first instance. As a result of this lead signal indicated by the arrow 44, the controlled apparatus responds more quickly than would otherwise be the case.

Referring again to the viscous damper 31, it will be recognized by those skilled in that art that the rod 32 begins almost immediately to move so as to follow the force applied thereto by movement of the housing 11 as above described. The rate of movement of the rod 32 of course depends upon the resisting force applied by the viscous damper which in turn depends upon the orifice size, the viscosity of the fluid, and the like. In any event, the rod 32 tends to seek its neutral position wherein the forces from damper springs 34 and 35 are balanced at rod 32. Thus it will be seen that the rod 32 moves toward the right as show in FIGURE 1, which was the direction of initial movement of the housing 11 as above referred to. As the rod 32 moves toward the right, the force applied by the feedback spring 36 becomes greater than the force applied by the damper spring 35 thus causing the spool valve to translate toward the right as viewed in FIGURE 1. As the spool valve translates toward the right, fluid flows from the source 16 thereof through the passageway 19 and to the right side of the cylinder 12 as viewed in FIGURE 1. Such movement thus causes the piston 13 along with the rod connected thereto and the feedback rod to move toward the left as viewed in FIGURE 1. Such movement toward the left tends to cause the spool valve 17 to again return to its null position. The movement of the rod 32 and the rod 37 in the manner above described becomes a relatively continuous operation until the quickener signal, or lead signal, as represented by the arrow 44 has been dissipated thus leaving only the initial mechanical input signal as represented by the arrow 43.

From the foregoing it can thus be seen that the servo actuator quickener apparatus as above described and as illustrated in FIGURE 1 causes the controlled apparatus to respond initially more rapidly to the application of the input command signal thereto and to gradually return to a command position as if there were no quickener signal, assuming the command signal has been applied to the controlled apparatus for a relatively long period of time.

A more thorough understanding of the operation of the servo actuator quickener in accordance with the present invention should become apparent by reference to the various graphs illustrated in FIGURES 2A, B and C. Time is plotted along the abscissa in each case. In FIGURE 2A, the mechanical input signal, in magnitude, is plotted along the ordinate, in FIGURE 2B the control surface position is plotted along the ordinate, and in FIGURE 2C the control apparatus position is plotted along the ordinate. As can be seen in FIGURE 2A, at a time indicated at 51 a mechanical input signal having a magnitude represented at 52 is applied substantially as a step function to the servo actuator quickener, for example, as an input signal applied to the end 27 of the bell crank 23 in FIGURE 1. For purposes of this explanation the input signal, in magnitude as illustrated at 52, remains applied to the system for a long period of time.

In response to the application of the mechanical input signal it can be seen that the control surface position changes from a predetermined substantially steady state position illustrated at 53 to a position as illustrated at 54 in a relatively short period of time as illustrated at 55. From this point the control surface position approaches a steady state position representative of the input magnitude 52 of the input signal and in so doing follows the curve as shown at 56.

In response to the rapid change of the control surface position as illustrated in FIGURE 2B, the controlled apparatus position changes from a position indicated at 61 very rapidly along the curve at 62 and passes through the desired position thus overshooting slightly this position. Thereafter as the control surface returns to the position indicated in a steady state response to the steady state input signal the controlled apparatus asymptotically approaches the desired position. As a comparative basis the same controlled apparatus but without the servo actuator quickener as illustrated in FIGURE 1, has its response plotted along the dotted line in FIGURE 2C. It can thus be seen that the controlled apparatus reaches the desired position rather rapidly, overshoots and then gradually approaches the desired position with the quickener apparatus, while without the quickener apparatus the desired position is only approached asymptotically but never quite reached.

Although the foregoing description has been given with respect to the apparatus shown in FIGURE 1 wherein a mechanical input signal is applied as indicated by the arrow 41 in FIGURE 1, it will be understood that an input signal in the opposite direction can also be applied with similar results only reversed from the above described.

Reference is now made to FIGURE 3 which illustrates in schematic form a servo actuator quickener apparatus in accordance with an alternative embodiment of the present invention. As will be apparent to those skilled in the art, the apparatus as illustrated in FIGURE 3 includes a pilot valve for controlling movement of the spool valve 17 which in turn controls application of the fluid to the cylinder 12 as above described. The pilot valve includes a flapper 71 and a pair of nozzles 72, each of which operates in accordance with old and well known principles. The positioning of the flapper 71 relative to the nozzle orifice is controlled by forces applied to the flapper extension 73 to which is connected a damper spring 74 and a feedback spring 75.

The damper spring 74 is affixed to a rod 76 which is translatable reciprocally within a pair of bearings 77 and 78 disposed within the housing 11. The rod 76 has an upwardly extending bracket 79 to which there is pivotally affixed a gear 81 and a disc 82 constructed of eddy current material of the type well known to the art. A permanent magnet 83 is rigidly affixed to the housing 11 and has downwardly depending end portions 84 which are positioned on each side of the eddy current disc 82 and cause the application of a magnetic field through the eddy current disc 82 as is well known in the art. A rack 85 is translatably positioned within a pair of bearings 86 and 87 supported within the housing 11. A link 88 is pivotally connected at 89 to the end 22 of the bell crank 23. The opposite end of the link 88 is pivoted as illustrated at 91 to the rack 88. Teeth 92 on the rack 85 mesh with teeth on the gear 81 which is rigidly affixed to the eddy current disc 82. The eddy current disc 82 in conjunction with the permanent magnet 83 provide the resisting force generating apparatus or damper which generates a lag signal or quickening signal which is proportional to the velocity of the input signal applied mechanically to the servo actuator quickening apparatus.

In operation of the apparatus illustrated in FIGURE 3, assuming that the operator applied in an input mechanical signal in the direction illustrated by the arrow 41, causing the housing to move toward the right as indicated by the arrow 42, it will be seen that the movement of the housing 11 is away from the arm 22 of the bell crank 23. This motion then through the link 88 is imparted to the rack 85 attempting to pull it toward the left with reference to housing 11 as viewed in FIGURE 3. This motion initially rotates the eddy curent disc in the direction illustrated by the arrow 93. As this rotation commences, the forces generated by the flux field of the magnet 83 impart a drag or retardation upon the rotation of the eddy curent disc. Therefore, this movement of the rack 85 toward the left is transmitted through the gear 81 to bracket 79 to the rod 76 to thereby cause the rod 76 to move toward the left as viewed in FIGURE 3. This movement toward the left then applies, through the damper spring 74, a force to the flapper extension 73 causing the flapper 71 to move more closely adjacent the nozzle 72 on the right as viewed in FIGURE 2. Thus fluid is caused to flow from the source 16 thereof through the passageway 20 to the left side of the cylinder 12 to force the actuator rod 14 along with the feedback rod 37 toward the right. A feedback signal is then applied through the feedback spring 75 to the extension 73 of the flapper to null the input signal when the rod has reached the desired position. As was the case in the embodiment of FIGURE 1 a feedback signal is applied through spring 75 to the flapper extension 73 with similar results. During this operation the eddy current disc rotates in a counterclockwise direction as shown by the arrow 93 during which a force in the opposite direction is applied to the flapper extension 73. Such operation continues until the forces from springs 74 and 75 are balanced at extension 73. Again it will be recognized by those skilled in the art that a signal may be readily applied in the opposite direction with opposite results.

Figure 4:
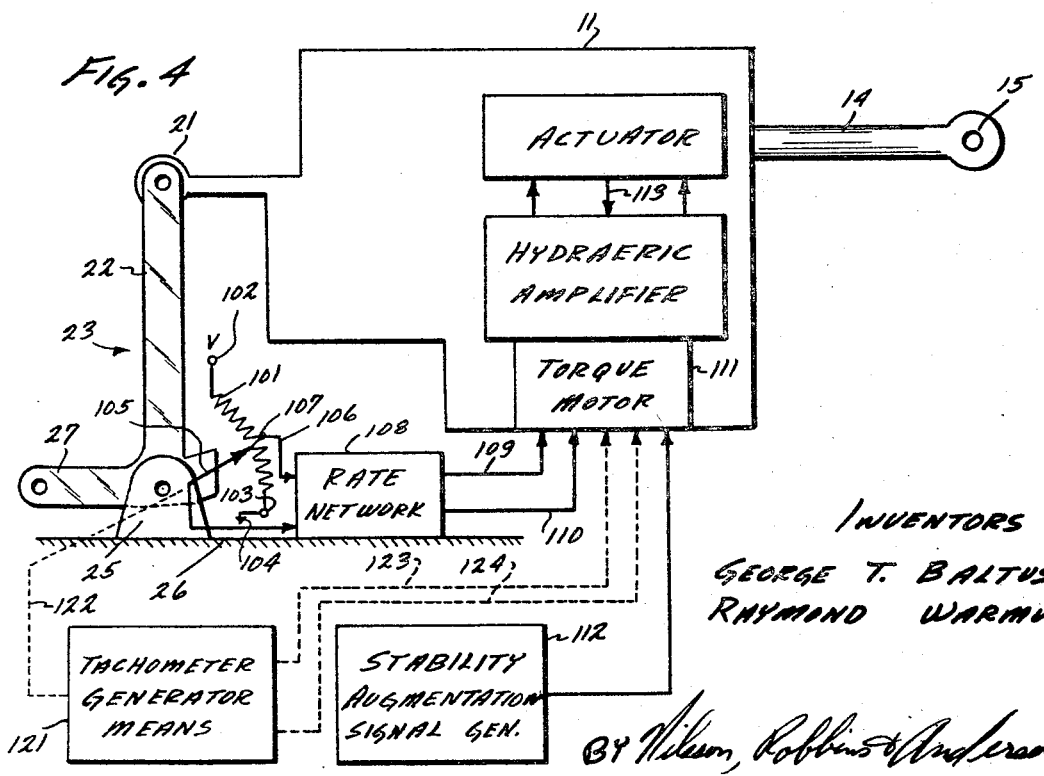
FIGURE 4 is a schematic representation partly in block form of yet another embodiment of a hydraeric servo actuator quickener in accordance with the present invention.

Reference is now made to FIGURE 4 wherein there is illustrated yet another alternative embodiment of apparatus in accordance with the present invention. As is shown in FIGURE 4, the resisting force or quickening signal is generated electrically. For example, there may be provided a potentiometer having a resistance element 101 to which there is connected at one terminal 102 a source of potential indicated by the symbol V while the opposite terminal 103 thereof is, for example, connected to a point of fixed potental such as ground 104. The movable arm 105 from the potentiometer is affixed to the bell crank 23 and is movable thereby. A lead 106 is connected to a center-tap terminal 107 of the resistance element 101 and also applies an input signal to a rate network 108. The movable arm 105 is also applied as an input signal to the rate network 108. The rate network may be any desired and will be readily apparent to those skilled in the art. For example, if the source of potential V applied to the resistance element 101 of the potentiometer is a source of direct current potential the rate network may be a simple RC differentiating network. The output of this rate network is then applied by way of leads 109 and 110 as an input signal to a torque motor 111 as is well known in the prior art. An alternative means of generating an electrical signal proportional to control velocity would be by means of a tachometer generator device 121 either linear or rotary which provides either an AC or DC signal. An AC type signal would be demodulated in a suitable circuit before being applied to the torque motor. The tachometer generator could be coupled to the input bell crank 23, for example, as shown by dash line 122 in FIGURE 4 or through gearing similar to that shown for the eddy current damper in FIGURE 3. The output could then be applied to the torque motor as shown by dash lines 123 and 124. It should also be understood that input signals may also be applied to the torque motor 111, for example from stability augmentation signal generator 112. The torque motor 111 is used as is well known in the prior art to control the hydraeric amplifier which in turn controls the flow of hydraeric fluid to the actuator as above described. As is indicated by the arrow 113 a feedback signal is generated by the actuator and applied to the hydraeric amplifier again is is well known in the prior art, one means of which is shown in FIGURE 3. For further and more specific detailed description of a hydraeric amplifier of the type illustrated in block form in FIGURE 4, reference is made to U.S. Patent 2,947,286 and therefore further description thereof will not be given at this time.

There has thus been disclosed a hydraeric servo actuator quickener mechanism which is simple and which may be inserted in series in a control link for purposes of causing a controlled apparatus to respond initially more quickly than otherwise would be the case by providing a lead signal to the control surface which positions the controlled apparatus in response to command signals applied thereto. Although various embodiments of a servo actuator quickener apparatus in acordance with the present invention have been illustrated schematically in some detail and described somewhat specifically in the foregoing specification, such detailed illustration and description is not to be taken as a limitaton upon the scope of the claims appended hereto.

What is claimed is:

1. In a control system for positioning a controlled apparatus in response to mechanical command signals applied thereto, said controlled apparatus having an inherent time lag in responding to said command signals, hydraeric apparatus for increasing initially the effect of said input signals by an amount proportional to the velocity thereof, said apparatus comprising:
    (a) actuator means adapted to be coupled to said controlled apparatus;
    (b) mechanical signal input means coupled to said actuator means;
    (c) means affixed to said controlled apparatus for producing a quickener signal having an amplitude proportional to the velocity of said mechanical signal and a phase relationship causing it to lead said mechanical input signal;
    (d) first coupling means connected between said quickener signal producing means and said mechanical input means for coupling the signal from said mechanical signal input means for coupling the signal from said mechanical signal input means to said quickener signal producing means;
    (e) a hydraeric amplifier means having input signal receiving means, said amplifier having hydraeric fluid output flow passages connected to said actuator;
    (f) and means coupling said quickener signal producing means to said amplifier input signal receiving means.

2. Hydraeric apparatus as defined in claim 1 wherein said quickener signal producing means includes a damper means, and rod means connected between said damper means and said first coupling means, said means coupling said quickener signal being connected to said rod.

3. Hydraeric apparatus as defined in claim 1 wherein said quickener signal producing means includes a magnetic damper means, and rod means connected between said magnetic damper means and said first coupling means.

4. Hydraeric apparatus as defined in claim 1 wherein said quickener signal producing means includes electrical signal generating means.

5. Hydraeric apparatus as defined in claim 1 which further includes mechanical feedback means connected between said actuator and said hydraeric amplifier means.

6. Hydraeric apparatus as defined in claim 5 in which said quickener signal producing means includes damper means having a first member and a second member, said second member being movable relative to said first member, said first member controlling the rate of movement of said second member.

7. Hydraeric apparatus as defined in claim 6 in which said first member is a magnet and said second means is an eddy current disc disposed for rotation adjacent said magnet about an axis, said axis of rotation being movable relative said magnet by an amount proportional to the velocity of said mechanical input signal.

8. Hydraeric apparatus as defined in claim 7 which further includes rod means coupled to said axis of rotation and movable therewith, and spring means coupling the movement of said rod to said amplifier input signal receiving means.

9. Hydraeric apparatus as defined in claim 4 wherein said electrical signal generating means includes means for producing an electrical signal proportional to the magnitude and direction of said mechanical input signal and a rate network coupling said electrical signal to said amplifier.

10. Hydraeric apparatus as defined in claim 9 wherein said amplifier input signal receiving means is a torque motor, said electrical signal producing means is a potentiometer coupled to said mechanical signal input means, and said rate network is an R-C differentiating network.

11. Hydraeric apparatus as defined in claim 4 wherein said electrical signal generating means includes a tachometer generator means coupled to said mechanical signal input means.

References Cited

UNITED STATES PATENTS

| | | | |
|---|---|---|---|
| 2,947,286 | 8/1960 | Baltus et al. | 91—387 |
| 3,208,352 | 9/1965 | Lucien | 91—387 |
| 3,242,822 | 3/1966 | Barltrop | 91—217 |

PAUL E. MASLOUSKY, *Primary Examiner.*